United States Patent
Theiler

(12) 
(10) Patent No.: US 6,203,763 B1
(45) Date of Patent: Mar. 20, 2001

(54) FILTER OR CATALYTIC-CONVERTER DEVICE

(76) Inventor: Anton Theiler, Dobl 14, D-94577, Winzer (DE)

(*) Notice: Subject to any disclaimer, the term of this patent is extended or adjusted under 35 U.S.C. 154(b) by 0 days.

(21) Appl. No.: 09/043,395

(22) PCT Filed: Sep. 12, 1996

(86) PCT No.: PCT/DE96/01710

§ 371 Date: Jul. 10, 1998

§ 102(e) Date: Jul. 10, 1998

(87) PCT Pub. No.: WO97/10882

PCT Pub. Date: Mar. 27, 1997

(30) Foreign Application Priority Data

Sep. 18, 1995 (DE) .......................... 295 14 798 U
Mar. 26, 1996 (DE) .......................... 296 05 508 U

(51) Int. Cl.[7] .................. B01D 53/34; B01D 53/86; B01D 45/14; F01N 3/28

(52) U.S. Cl. .................. 422/177; 422/171; 422/172; 422/180

(58) Field of Search .................. 422/177, 169–171, 422/172, 224–225, 228; 55/400; 96/125; 95/269, 270, 272; 261/92

(56) References Cited

U.S. PATENT DOCUMENTS

| 3,607,133 | 9/1971 | Hirao . |
| 4,033,727 | 7/1977 | Vautrin . |
| 4,244,922 | 1/1981 | Burke . |
| 4,374,095 | 2/1983 | Legg . |
| 5,336,471 | 8/1994 | Brophy . |

FOREIGN PATENT DOCUMENTS

| 369224 | 2/1923 | (DE) . |
| 1935154 | 3/1970 | (DE) . |
| 2931041A1 | 2/1980 | (DE) . |
| 3519543A1 | 12/1986 | (DE) . |
| 3722636A1 | 1/1989 | (DE) . |
| 69100926T2 | 1/1994 | (DE) . |
| 4313861A1 | 11/1994 | (DE) . |
| 2161355 | 7/1973 | (FR) . |
| 791222 | 2/1958 | (GB) . |
| 7-102959A | 4/1995 | (JP) . |

OTHER PUBLICATIONS

German Search Report for DE 29514798.9.
German Search Report for DE 29605508.5.

*Primary Examiner*—Hien Tran
(74) *Attorney, Agent, or Firm*—Domingue & Waddell, PLC

(57) ABSTRACT

A filter or catalyst apparatus in which a fluid medium is brought in a housing as completely as possible into contact with the surface of an arrangement disposed in the housing, the arrangement having openings in the direction of flow of the medium, wherein the arrangement comprises stationary parts (24; 124; 224) and movable parts (22; 122; 322) and the fluid medium is so guided that it flows alternately through respective stationary parts (24; 124; 224) and moved parts (22; 122; 322) of the arrangement, and a catalyst apparatus by which a fluid medium, preferably gas, is brought into contact with a catalytic substance, by said medium flowing through a carrier body (409; 425; 439) for the catalytic substance, wherein the carrier body (409; 425; 439) includes grills or apertured plates which carry the catalytic substance and through which the fluid medium flows, and there is provided a drive device (408; 432) which moves the grills or apertured plates perpendicularly to the direction of flow of the fluid medium.

20 Claims, 9 Drawing Sheets

FILTER OR CATALYTIC-CONVERTER DEVICE

The present invention concerns a filter or catalyst apparatus through which a fluid median flows. In that respect the present invention concerns filter apparatuses for separating solids and/or aerosols which are distributed in the fluid medium by deposit on a surface. The present invention further concerns catalyst apparatuses in which the fluid medium is brought into contact with a catalytically active surface in order to produce corresponding chemical reactions in the fluid medium.

The main problem with apparatuses of that kind involves as far as possible bringing all of the fluid medium into contact with a surface, while at the same time the flow resistance for the fluid medium is to be minimised.

In accordance with the invention that object is attained in that the apparatus comprises stationary and movable parts, and the fluid medium is so guided that it flows alternately through respective stationary and moved parts of the apparatus.

In catalyst apparatuses that object can also be attained in that the carrier body includes grills or apertured plates which carry the catalytic substance and through which the fluid medium flows, and there is provided a drive device which moves the grills or apertured plates perpendicularly to the direction of flow of the fluid medium.

If this design in accordance with the invention is used as an oil filter for the crankcase discharge gases in the intake region of the carburettor of a carburettor engine or as an exhaust gas cleaning device in the exhaust gas system of a piston engine, a further substantial advantage is that the apparatus acts as a sound damper and considerably reduces the induction or exhaust gas noises.

In that respect it is preferred that the movable parts rotate in a cylindrical housing as the drive for the movable parts requires the lowest level of energy expenditure, when the movement is a rotating movement. The cylindrical shape of the housing follows from the rotational movement.

In that respect it is further preferred that the axis of rotation of the movable parts is disposed coaxially with respect to the cylindrical shape of the housing. In that way the amount of space required for the apparatus can be minimised.

In particular it is preferred that a drive device is disposed at one of the end faces of the cylinder. A preferred embodiment provides that the movable parts are of disc form and that the stationary parts which are arranged therebetween are flat. That provides that the apparatus is of a particularly compact construction.

Preferably a gas intake connection is arranged at the one end of the cylinder and a gas outlet connection is arranged at the opposite end of the cylinder. The flow of the medium in the apparatus is optimised in that way.

In that case the openings may be in respective mutually opposite annular regions of the movable and stationary parts, thereby producing very intensive turbulence in the medium.

A particularly simple manufacturing option for the apparatus is achieved by the movable parts being arranged on a common shaft.

If the apparatus serves for the separation of an aerosol from the medium, it is preferable for the axis of rotation of the movable parts to be disposed horizontally, for the gas intake connection and the gas outlet connection to be arranged at the top side of the housing, and for an outlet opening for the separated liquid to be additionally provided at the underside of the housing.

In accordance with a further preferred embodiment of the invention the movable and stationary parts are in the form of hollow cylinders and are disposed alternately coaxially relative to each other. That provides for a constant relative speed as between the movable parts and the medium flowing through the apparatus.

In that case it is preferred for a gas intake connection to be arranged at the periphery of the cylinder and for a gas outlet connection to be arranged at the lower end thereof. Due to the centrifugal effect of the rotating cylinders, substances which are to be separated off in that way are always moved away from the gas outlet and improved clearing of the medium can be achieved.

Preferably in this case also the openings are disposed in respective mutually oppositely arranged regions of the movable and stationary parts.

The apparatus is of a particularly simple design configuration if the movable parts which are in the form of hollow cylinders are arranged on a common driven carrier disc.

If this apparatus is to be used for the purposes of separating aerosols out of the medium, it is particularly advantageous if an outlet opening for the liquid which is separated off is additionally provided at the underside of the housing.

The apparatuses according to the invention can be particularly economically produced if the stationary and the movable parts are in the form of apertured plates, and in that case particularly advantageous coating with a catalyst material is possible, for example by sputtering.

A particularly light construction for the apparatuses according to the invention is achieved if the stationary and the movable parts are in the form of grills.

Preferably the drive is an electric motor.

In order further to enhance the efficiency of the apparatus, the stationary and/or the movable parts of the apparatus can be hollow and can be in communication with a feed device for an auxiliary gas.

If the movable parts of the apparatus are hollow, a particularly advantageous specific shape for the outlet openings for the auxiliary gas is one in which they are formed by outward bulge portions which rise in the opposite direction to the direction of rotation and form a rearwardly directed opening. By virtue of that arrangement, an even greater reduced pressure for suction of the auxiliary gas can be generated by virtue of the rotary movement of the movable parts of the apparatus, and at the same time that configuration prevents clogging of the openings with fouling matter.

This apparatus can be embodied in a particularly simple fashion if the auxiliary gas is air.

In a pure catalyst apparatus the carrier body may be for example in the form of a disc disposed in the plane perpendicularly to the direction of flow. That provides that the catalyst apparatus is of a very small construction.

Preferably however the carrier body is in the form of a cylindrical or frustoconical or conical drum. That arrangement means that it is possible to treat particularly large amounts of gas.

As only a very slight pressure drop occurs in the catalyst apparatuses according to the invention when the gas flows through the carrier body, there is the possibility here of for example feeding fresh air to the exhaust gas flow in the case of exhaust gas catalytic converters for motor vehicles. In that way, it is always possible to ensure that there is an excess of oxygen in the exhaust gas to be treated by the catalytic converter, without expensive regulation by the lambda probe. Thus the expensive lambda control system can be omitted and/or the engine can be operated with a better level of efficiency and/or a higher compression ratio.

It is then particularly preferred for the further medium (for example the fresh air) to be fed to the intake side of the catalytic converter by means of a driven device for conveying that medium.

It is further preferred, when using carrier bodies of a drum-like configuration, for the carrier bodies to be arranged in a chamber whose cross-section corresponds to a polygon, perpendicularly to the axis of rotation of the drum.

Preferably, in that arrangement, devices which oppose a rotary movement of the medium can additionally be provided in the interior of the chamber.

Preferably an electric motor can be used as the drive device. It is likewise possible for the drive device to be an exhaust gas drive, that is to say for example a turbine wheel which is driven by the exhaust gas flow. In that case the turbine wheel may also be mounted directly on the drum-like carrier body. It is also possible for the drive energy to be taken from an engine whose exhaust gases are fed to the catalyst apparatus. For example the catalyst apparatus can simply be driven by a V-belt which is connected to the crankshaft of the engine.

It is particularly preferred if the carrier body comprises one or more fine grids or grills which are coated with the catalytic substance. A particularly light carrier body can be constructed in that way.

In that respect rolled (levelled) grids are to be particularly preferred as they have a considerably lower frictional resistance in the medium by virtue of their substantially smoother surface.

The system according to the invention operates on the basis of the inertia and centrifugal force principle:

moving bodies seek to remain in motion, and moving bodies seek to move along a straight line.

The gas flow which moves through the exhaust gas pipe involves a flow speed of 88 m/sec in an example (engine rotates at 6000 revolutions per minute, swept capacity 5 l, exhaust gas pipe diameter 60 mm). In that situation the surface speed of the carrier body is between 25 m/sec to 100 m/sec, depending on the respective speed of rotation. The gas reaction at the surface is multiplied by that artificially produced surface speed. Suitable measurements about the increase in the reaction speed at the catalyst in dependence on the flow speed have already been conducted by the inventor. In those measurements, erroneous temperature measurement was effected on platinum thermobeads in the exhaust gas flow, which are produced by the catalytic reaction. The rise in temperature occurred as shown in the Table, in dependence on the speed of the exhaust gas flow.

| Display coated Pt~thermo ° C. | Differential temp at 2 l/min air through-put ° C. | Differential temp at 4 l/min air through-put ° C. | Differential temp at 6 l/min air through-put ° C. |
| --- | --- | --- | --- |
| 750 | 12.5 | 30.0 | 43.0 |
| 700 | 12.5 | 30.0 | 43.0 |
| 650 | 12.5 | 30.0 | 41.0 |
| 600 | 12.0 | 29.0 | 40.0 |
| 550 | 12.0 | 27.0 | 39.0 |
| 500 | 11.0 | 24.5 | 35.0 |
| 450 | 9.0 | 20.0 | 28.0 |
| 400 | 0.4 | 10.0 | 13.5 |

This Table is based on a CO-proportion in the exhaust gas of 1%. With a higher CO-content in the exhaust gas, temperature increases of over 100° C. were measured, although the thermobeads of a diameter of 1 to 1.5 mm were exposed to the gas flow at a temperature of 400 to 750° C. That showed that there was a temperature difference of more than 100° C. relative to the exhaust gas temperature, and thus thermal energy was liberated at the thermobead, which was produced by post-combustion of the CO- and CH-components present in the exhaust gas, at the thermobead. That effect makes it possible in accordance with the invention to convert the conventional honeycomb catalytic converters which are constructed on an oxide-ceramic basis for private motor car Otto-cycle engines to non-toxic metal catalytic converters.

BRIEF DESCRIPTION OF THE DRAWINGS

Preferred embodiments of the invention are described in greater detail hereinafter with reference to the accompanying drawing in which:

FIG. 1 shows an embodiment of the invention in which the medium to be treated flows substantially horizontally through a housing 10 in the form of a cylinder. A gas intake connection 12 for the medium to be treated (for example air containing oil vapour and mist, exhaust gases from Diesel or Otto-cycle engines) is arranged at the left-hand end of the cylinder, in the upper region thereof. A gas outlet connection 14 for the treated medium is arranged at the right-hand end of the cylinder, in the upper region thereof. Preferably the two connections 12, 14 are not arranged coaxially but displaced relative to each other.

Figure 1:
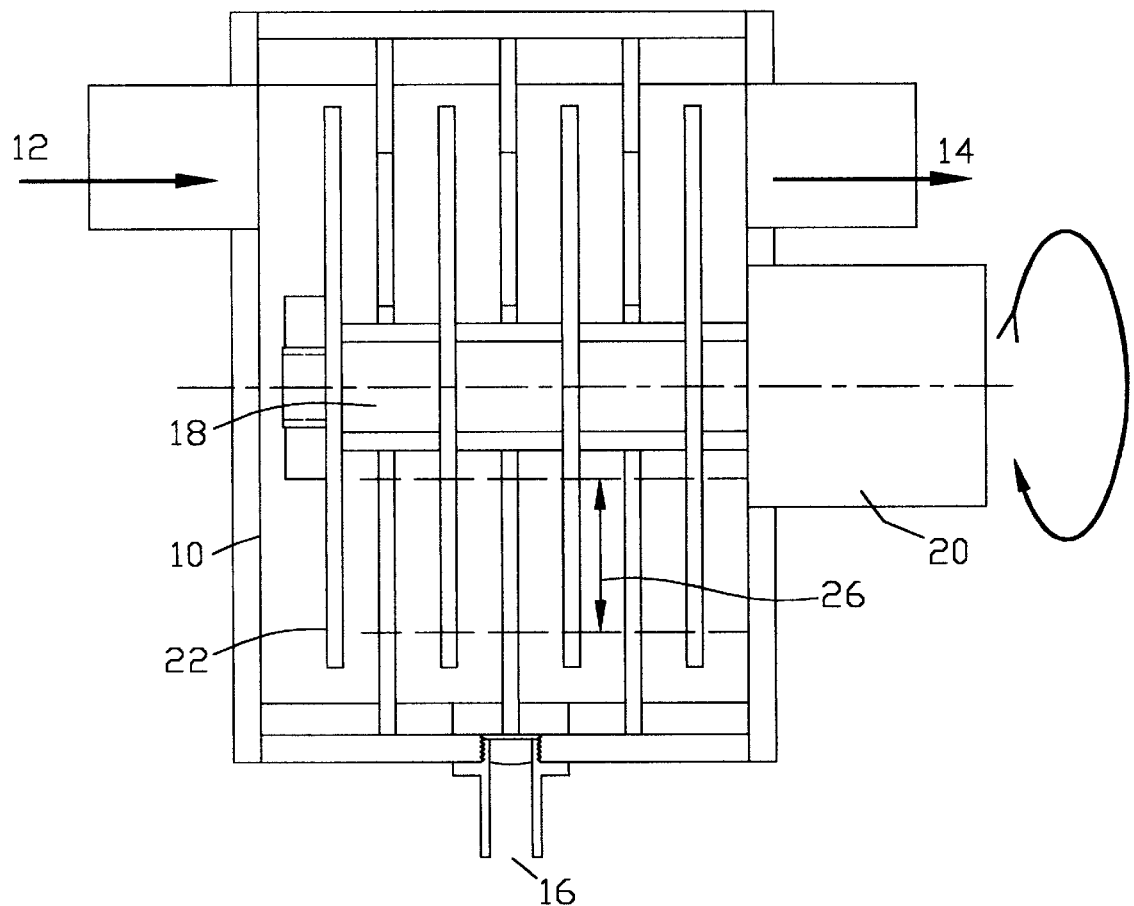
FIG. 1 shows an embodiment of the invention in the form of an axial filter in a vertically sectional view.

Disposed at the peripheral surface of the cylinder in the lower part thereof is an outlet connection 16 for the separation products (for example oil condensate). It will be appreciated that the connection 16 can be omitted if the apparatus is used as a catalyst.

Mounted coaxially with respect to the axis of the cylinder shape in the housing 10 is a shaft 18 which passes through the right-hand end face and which is connected to the compressed air or electric motor 20 which is disposed at that location. Four discs 22 are fixed on the shaft 18 at uniform spacings relative to each other, as movable parts. Between the discs 22, three stationary discs 24 are sealingly fixed to the housing 10 around sane at uniform spacings relative to the movable discs 22. The shaft 18 passes through the stationary discsc 24.

All the discs 22, 24 may comprise grid material or apertured material. Preferably the discs 22, 24 have respective mutually lined regions 26 in the form of circular rings, with holes in the disk 22, 24. If the apparatus serves as a catalyst apparatus, the discs 22, 24 comprise the catalytically active material or are at least partially coated therewith.

Figure 2:
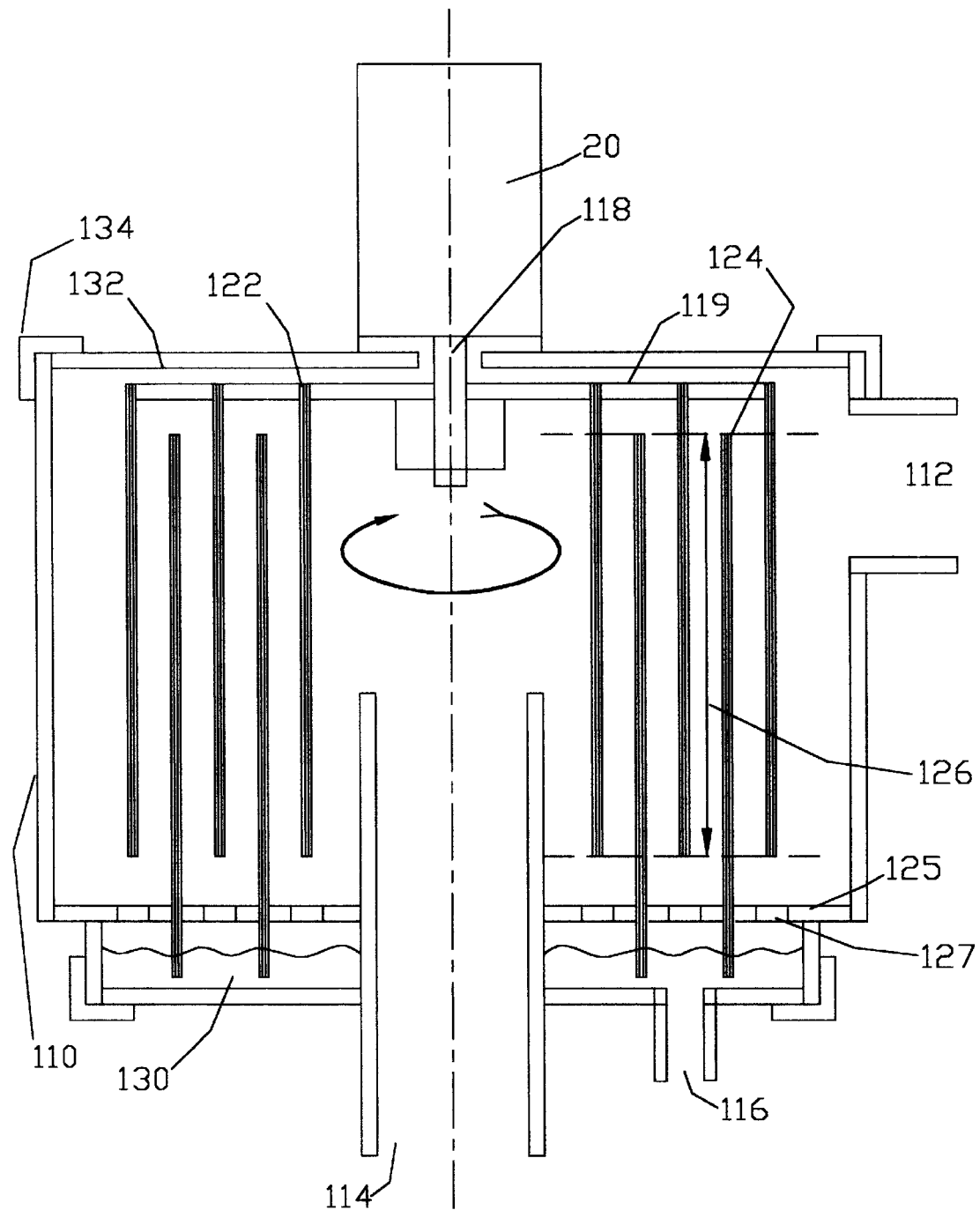
FIG. 2 shows an embodiment of the invention in the form of a radial filter in a vertically sectional view.

FIG. 2 shows a further embodiment of the invention in which the medium to be treated flows through a housing 110 in the form of an upright cylinder. A gas inlet connection 112 for the medium to be treated (for example air bearing oil vapour and mist, exhaust gases from Diesel or Otto-cycle engines) is arranged at the right-hand peripheral surface of the cylinder in the upper region thereof. A gas outlet connection 114 for the treated medium is arranged in the centre of the lower end of the cylinder. An outlet connection 116 for the separation products (for example oil condensate) is disposed laterally in the lower end of the cylinder. It will be appreciated that the connection 116 can be omitted if the apparatus is used as a catalyst apparatus. A shaft 118 is mounted in the housing 110 coaxially with respect to the axis of the cylinder shape. The shaft 118 passes through the upper end face and is connected to the compressed air or electric motor 20 disposed at that location. Fixed to the shaft 118 is a carrier disc 119 on which three hollow cylinders 122 which are of different diameters and which are arranged concentrically at uniform spacings relative to each other are suspended, as movable parts. Two stationary hollow cylinders 124 are fixed to a horizontal intermediate plate portion 125 of the housing 110 between the movable hollow cylinders 122, at uniform spacings relative to the movable hollow cylinders 122. Beside the stationary hollow cylinders 124 the intermediate plate portion 125 has openings 127 which lead into a sump 130 disposed therebeneath, for the separation products.

The gas outlet connection 114 extends in the form of a pipe through the intermediate plate portion 125 to a position approximately at the mid-height level of the housing 110.

The upper end face of the housing 110 is in the form of a cover 132 which is fixed by means of a closure arrangement 134 and on which the motor 20 is fixed and the shaft 118 is mounted. In that way the apparatus can be easily taken apart, if that is necessary for maintenance or cleaning operations.

All the hollow cylinders 122, 124 can comprise grill material or apertured material. Preferably the hollow cylinders 122, 124 have respective mutually oppositely disposed cylindrical regions 126 with holes. If the apparatus serves as a catalyst apparatus, the hollow cylinders 122, 124 comprise the catalytically active material or are at least partially coated therewith.

Figure 3:
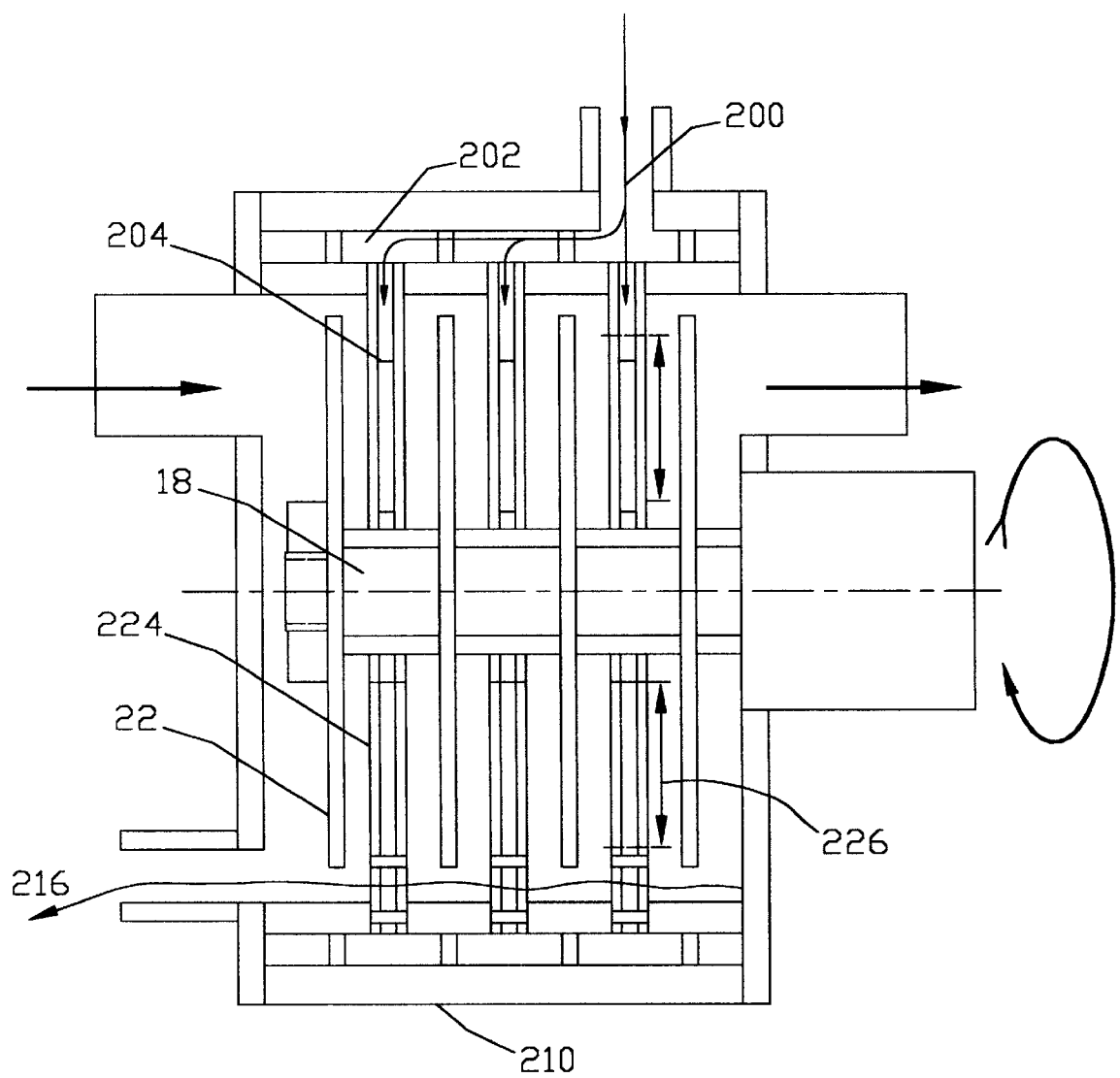
FIG. 3 shows an embodiment of the invention in the form of an axial filter with additional auxiliary air feed through the stationary parts in a vertically sectional view.

FIG. 3 shows a modified embodiment of the axial filter of FIG. 1, in which an auxiliary gas can additionally be supplied. When the apparatus is used as a separation apparatus for separating the liquid from an aerosol or a vapour-mist mixture the auxiliary gas serves for cooling the medium and thus for enhancing the condensation effect. In this case fresh air is preferably used as the auxiliary gas.

If the apparatus is used as a catalyst apparatus when employed as an exhaust gas catalytic converter fresh air can also be supplied in order thus to improve the lambda value of the exhaust gas. In that case for example expensive lambda regulation of the catalytic-converter Otto-cycle engine can be eliminated without disadvantages in terms of the exhaust gas emission values. In addition the feared overheating of the catalytic converter can be reliably prevented. It will be appreciated that when the apparatus is used as a chemical catalyst apparatus any auxiliary gas but also for example a reaction partner can be supplied.

In the embodiment shown in FIG. 3 the stationary discs 224 are each duplicated and enclose a narrow hollow space or cavity 204. The cavity 204 is closed in an annular configuration in the region around the shaft 18. The peripheral surface of the housing 210 is also of a double-wall structure and encloses a further hollow space or cavity 202 with which the cavities 204 are in communication therearound. An auxiliary gas connection 200 communicates with the cavity 202. The auxiliary gas thus passes by way of the auxiliary gas connection 200 into the cavity 202 in the peripheral surface of the housing 210 and from there passes into the cavities 204 between the stationary discs 224. The auxiliary gas can cool the discs 224. Through apertured regions 226, in the form of circular rings, in the discs 224, the auxiliary gas then comes into contact with the medium which also has to flow through the apertured regions 226. Corresponding apertured regions 26 are also provided here in the movable discs 22. Alternatively the movable discs 22 can comprise grill material.

In order not to interfere with the cavity 202, in this case the outlet connection 216 for the separation products can be taken out laterally at the lower end of one of the end faces of the housing 210.

Figure 4:
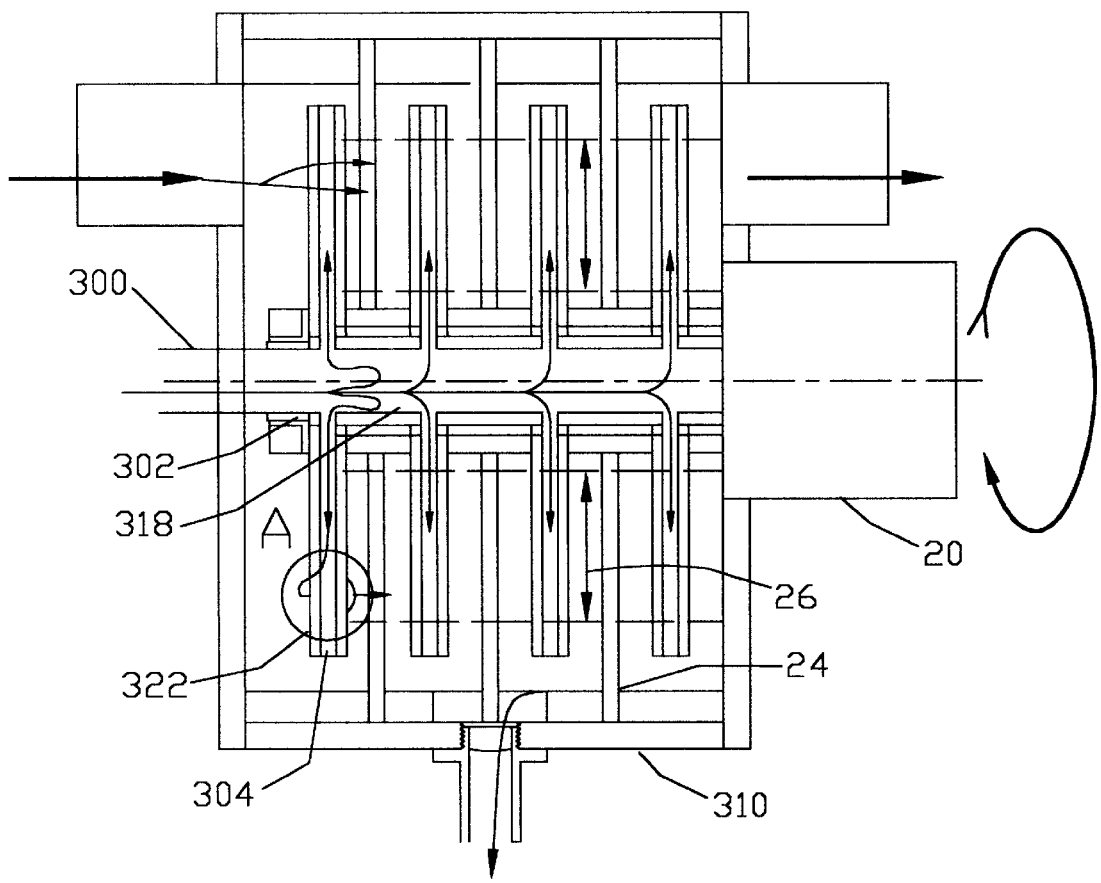
FIG. 4 shows an embodiment of the invention in the form of an axial filter with additional auxiliary air feed through the movable parts in a vertically sectional view.

A further embodiment of the axial filter of FIG. 1 with an auxiliary gas feed is shown in FIG. 4. In this case however in contrast to FIG. 3 the auxiliary gas is supplied not through the stationary parts of the apparatus but through the movable parts thereof.

In this embodiment the auxiliary gas connection 300 is disposed in the centre of the end face of the housing 310 opposite the motor 20. It is in the form of a stationary pipe which opens in the housing 310 in the interior of the shaft 318 which in this case is in the form of a tube. Sealing integrity as between the outside of the pipe of the auxiliary gas feed and the inside of the tubular shaft is afforded by way of a labyrinth seal 302. Four pairs each of two moveble discs 322 are arranged on the shaft 318. Disposed between the discs 322 is a respective narrow hollow space or cavity 304 which communicates with the interior of the shaft 318 and which is closed at the outside edge of the discs 322. In this case also the stationary and movable discs 24, 322 have respective mutually oppositely disposed apertured regions 26 in the form of circular rings. The interior of the shaft 318 is sealingly closed off at the motor end.

In this case therefore the auxiliary gas is passed into the cavity in the shaft 318 through the auxiliary gas feed 300. From there it is distributed to the cavities 304 between the individual discs 322. There it comes into contact through the apertured regions 26 with the medium which in fact also has to flow through the apertured regions. In that respect the configuration shown in FIG. 4 enjoys the particular advantage that the auxiliary gas is conveyed outwardly by the centrifugal action in the rotating discs, without involving further auxiliary means for that purpose. That can even compensate for a slightly increased pressure in respect of the medium to be purified, relative to the auxiliary gas.

Figure 5:
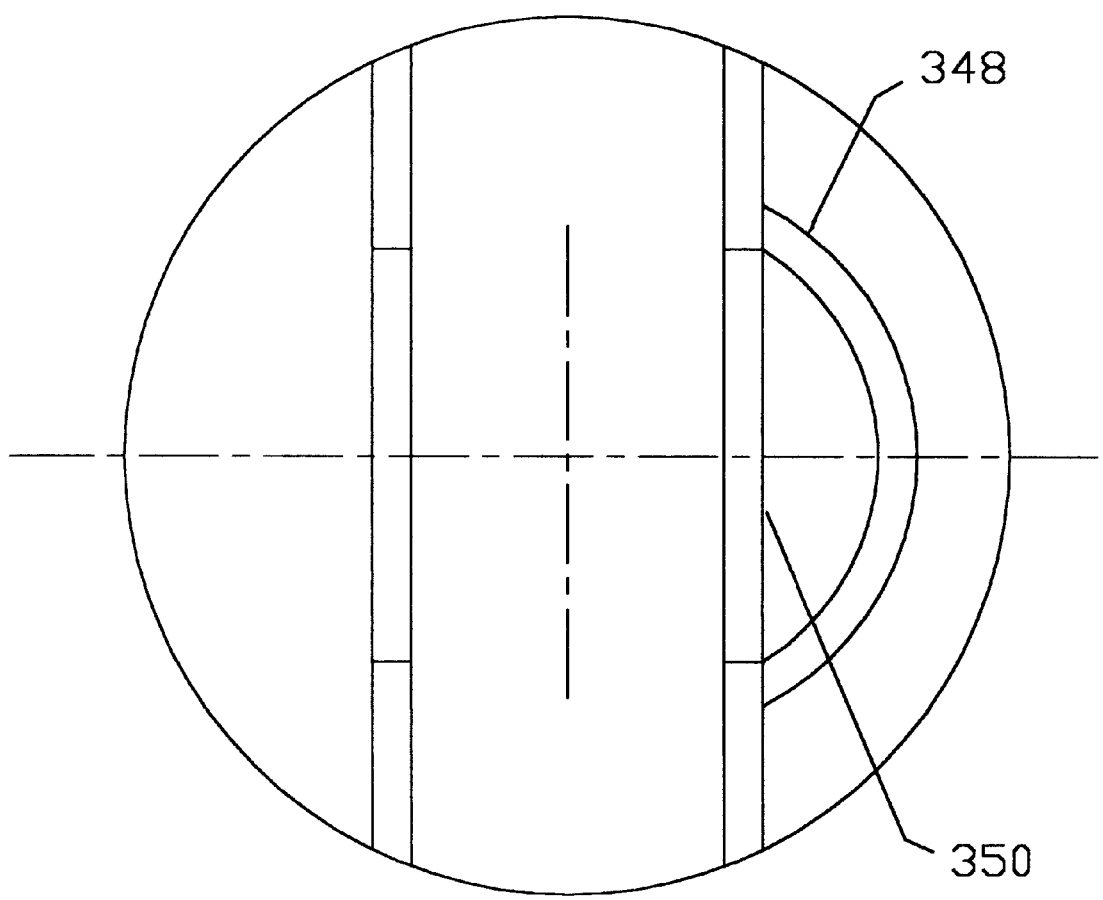
FIG. 5 shows a sectional view of a detail of an opening to the auxiliary gas outlet from FIG. 4.
Figure 6:
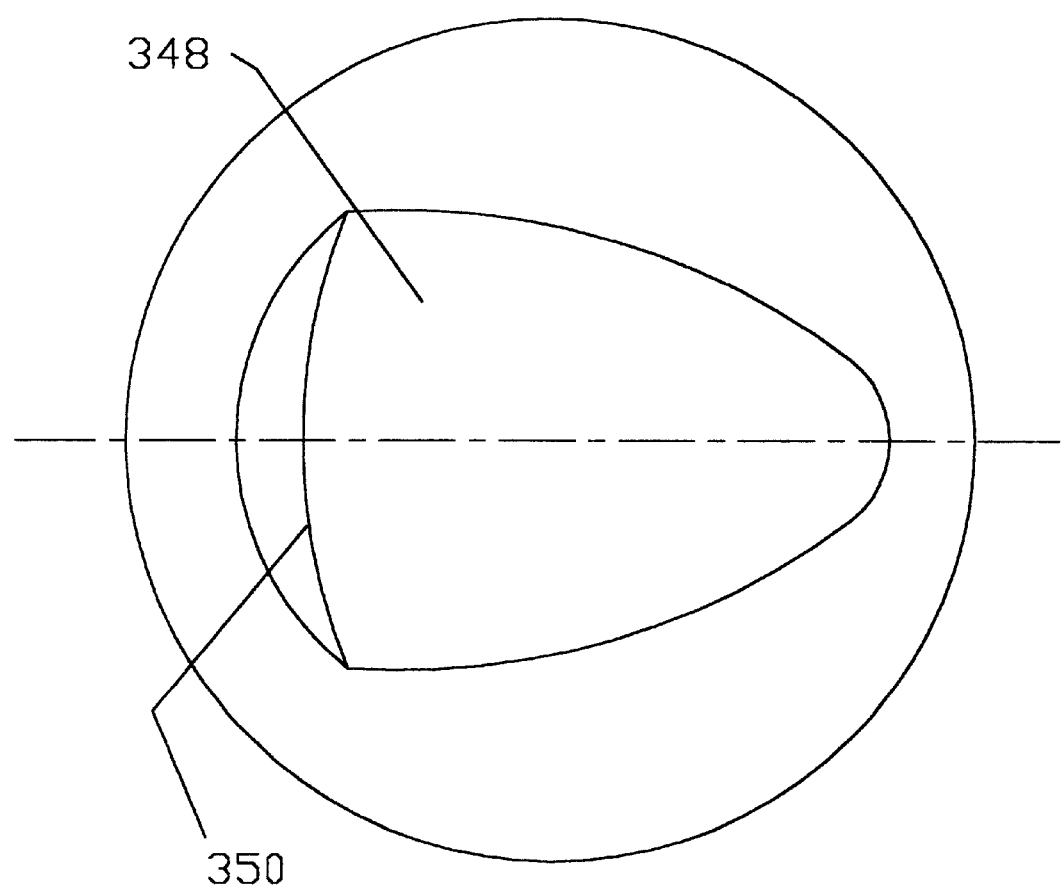
FIG. 6 is a view from the front of a detail of an opening to the auxiliary gas outlet from FIG. 4.

In order further to improve that conveyor effect and at the same time to prevent clogging of the outlet openings, the outlet openings are preferably of the configuration shown in FIGS. 5 and 6. In that arrangement, disposed over the actual outlet opening is a curved cover 348 which is of a closed configuration in the direction of rotation of the disc 322 and which rises in the opposite direction to the direction of rotation. The opening 350 through which the auxiliary gas issues is then disposed at the rear side of the cover 348. Preferably that construction can be produced by the curved covers 348 being produced by being pressed out of the previously flat disc, in which case the stamp or punch which is used for that purpose has a suitable break-away edge which produces the opening 350. Cutlet openings of that kind, provided with covers 348, may be provided on all outward sides of the discs 322 or preferably only on the side of the discs 322 which faces away from the main direction of flow of the medium (large arrows in FIG. 4).

In the embodiments of the present invention with rotating discs 322, instead of a disc 322 it is also possible to provide a fan wheel or impeller which then at the same time provides for conveying the medium.

In these embodiments of the invention the 'stationary' parts can also be driven in a direction which is opposite to the direction of movement of the moving parts. That can produce an even better effect, but on the other hand the structural expenditure is greater.

This notion may be particularly easily carried into effect in the embodiment shown in FIG. 2 as in that case it is only necessary for the previously stationary hollow cylinders also to be arranged on a rotating disc which is then driven for example by a motor arranged at the bottom.

The embodiments of FIGS. 1, 3 and 4 must additionally be provided on the outside with an auxiliary shaft which extends parallel to the shaft 18 and which drives the discs that are to be moved in the opposite direction, for example by way of gear rings.

Figure 7:
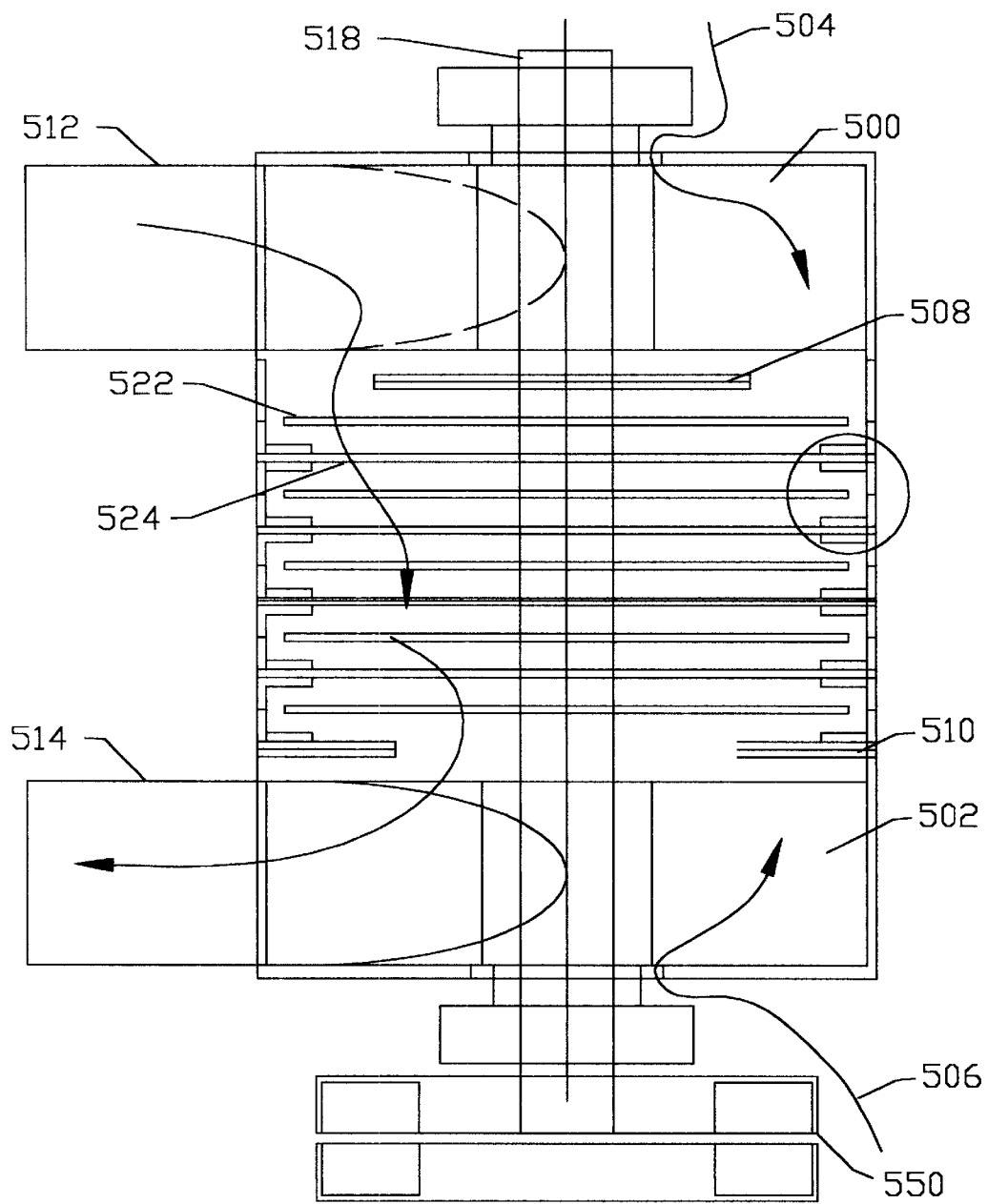
FIG. 7 shows a sectional view of a further especially preferred embodiment of the invention which is especially suitable for clearing the exhaust gases of diesel engines.
Figure 8:
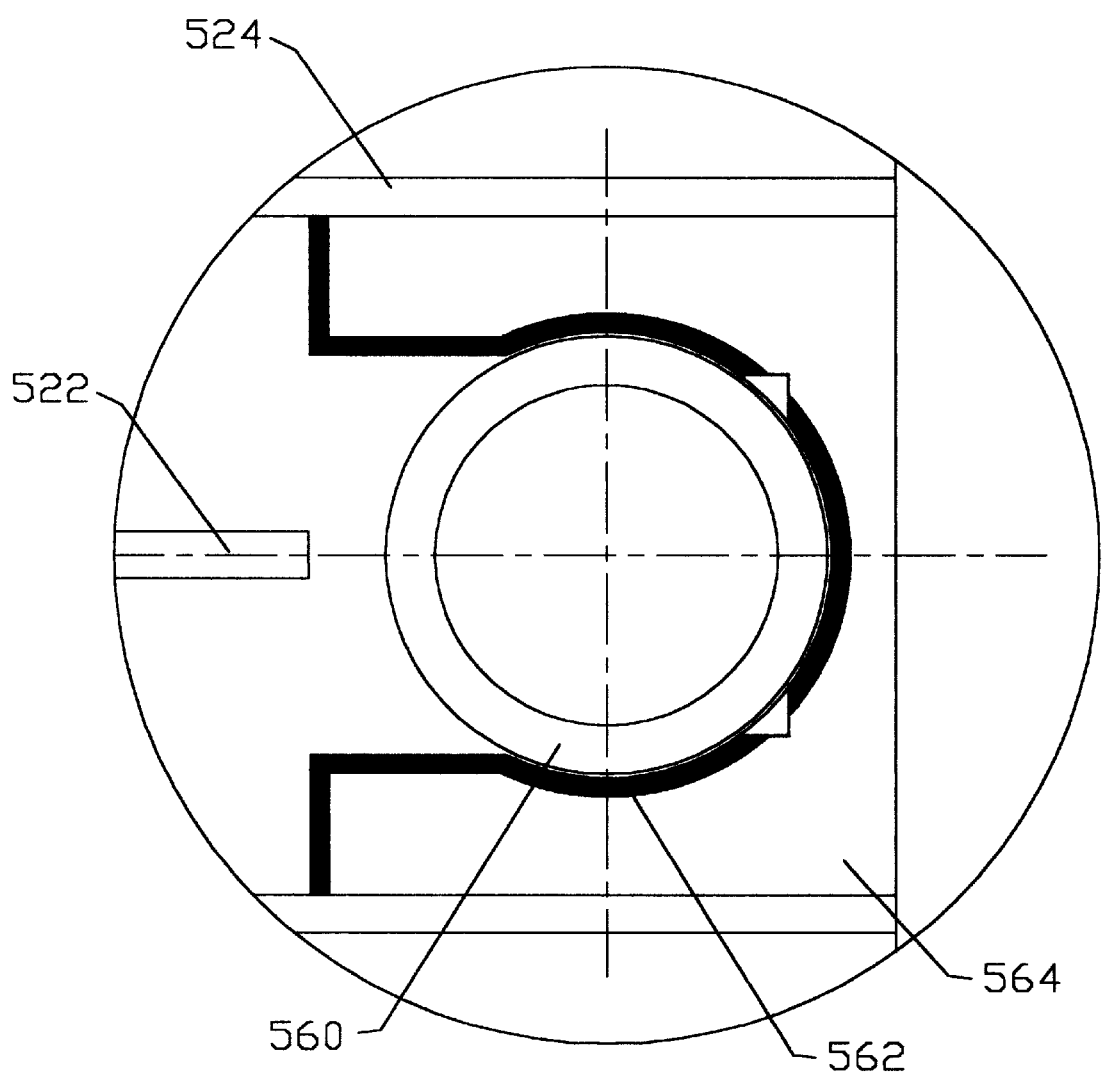
FIG. 8 shows a detail of FIG. 7.
Figure 9:
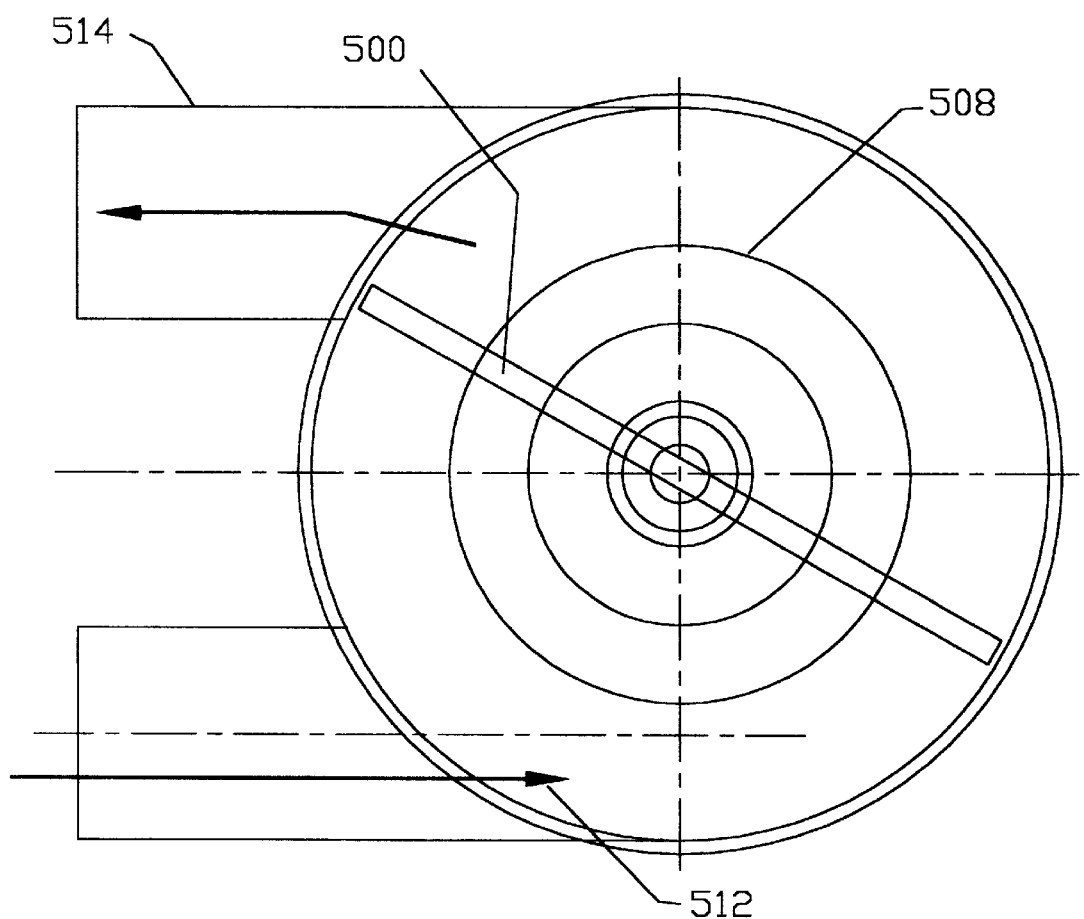
FIG. 9 shows the embodiment according to FIG. 7 from above.

FIGS. 7, 8 and 9 show a further improved embodiment of the invention on the basis of the embodiment according to FIG. 1. This embodiment is particularly suitable for cleaning diesel soot from diesel exhaust gases. Doing so, the medium to be cleaned is fed in through a gas entry connector 512 at the peripheral area of the cylindrical housing. Said gas entry connector 512 is leading at a driving device 500 for the shaft 518 on which the movable disks 522 are mounted. The driving device 500 here is consisting of a flat sheet which is perpendicularly mounted to the tangential direction of flow of the incoming gas and is extending through the rotational axis of the shaft 518 in a slot in said shaft 518.

The arrangement of moveable and stationary disks 522, 524 is corresponding to FIG. 1. On the gas exit side, said disks 522, 524 are followed by a further driving device 502 which is constructed as the driving device 500. Therefrom, the gas is leaving the apparatus via a gas exit connector 514 which, too, is provided as the peripheral area of the cylindrical housing in a tangential direction.

By the construction of the driving devices 500, 502 according to the invention in operation a vacuum is created in the driving devices close to the shaft 518. This vacuum can be used for sucking an auxiliary gas, for example ambient air along the shaft 518. To this end, it is sufficient to dispense with a sealing of the shaft 518 with respect to the housing. The arrows 504, 506 are showing this stream of the auxiliary air.

To achieve an even better conveying of the medium to be cleaned, there is provided an impervious disk 508 between the driving device 500 on the gas entry side and the disks 522, 524 which is extending parallel to these disks and which is extending about to the half radius of the housing. Further between the disks 522, 524 and the driving device 502 on the gas exit side, there is provided a ring 510 which from the wall of the housing is extending inwardly to about the half radius.

According to the instant invention, the shaft 518 can be connected to a collectorless generator and an electric motor 550. Said motor can for example act as a driving motor during the cranking of a diesel engine connected with the apparatus according to the invention because in this instant the major amount of soot is occuring while simultaneously no exhaust gas stream is created which would be sufficient to drive the apparatus according to the invention. In the continuous operation then a part of the exhaust gas energy can be used for the production of current and possibly a generator can be dispensed with.

The detail according to FIG. 8 is showing a further preferred improvement of the invention: In the areas with little flow close to the peripheral area of the housing between the stationary disks 524 for example the filtered soot is deposited. According to the invention, in this area between the stationary disks 524 there is provided an electric heating element 560 being mounted by means of a ceramic insulation layer 562 on supporting rings 564. If during the operation in regular intervals electric current is sent through said heating element 560, the occurring soot then can be burned-off and has not to be removed with trouble.

In all embodiments according to the invention a further reaction partner in liquid form can be injected. For example when cleaning diesel exhaust gases additionally urea can be added to bind the nitrogen oxides.

What is claimed is:

1. Filter or catalyst apparatus comprising a housing containing filter or catalyst elements wherein a fluid medium is brought into contact with the surface of said filter or catalyst elements positioned in the housing and having a plurality of passages disposed between the filter or catalyst elements and in the direction of flow of the medium, wherein the filter or catalyst elements comprise: stationary (24; 124; 224) and movable filter or catalyst elements (22; 122; 322) and, wherein the fluid medium is guided in such a way that it flows alternately through the respective stationary (24; 124; 224) and movable filter or catalyst elements (22; 122; 322) of the apparatus.

2. Apparatus according to claim 1, wherein said housing is a cylindrical housing and wherein the movable filter or catalyst elements (22; 122; 322) rotate in the cylindrical housing (10; 110; 210; 310).

3. Apparatus according to claim 2, wherein an axis of rotation of the movable filter or catalyst elements (22; 122; 322) is arranged coaxially with the cylindrical housing (10; 110; 210; 310).

4. Apparatus according to claim 2, wherein a drive device (20) is disposed at one end of the cylindrical housing.

5. Apparatus according to claim 1, wherein the movable elements (22; 322) are disc-shaped and the stationary elements (24; 224) arranged therebetween are flat.

6. Apparatus according to claim 5, wherein said housing is a cylindrical housing, and wherein a gas intake connection (12; 112) is arranged at the one end of the cylindrical housing and a gas outlet connection (14; 114) is arranged at the opposite end of the cylindrical housing.

7. Apparatus according to claim 5, wherein the passages are aligned so the passages are in respective mutually opposed to each other in a disposed regions (26), in the form of circular rings, of the movable filter or catalyst elements (22; 322) and the stationary filter or catalyst elements (24; 224).

8. Apparatus according to claim 1, wherein the movable elements (22; 322) are arranged on a common shaft (18; 318).

9. Apparatus according to claim 6, wherein an axis of rotation of the movable elements (22; 322) is horizontal, the gas intake connection (12) and the gas outlet connection (14) are arranged at a top side of the housing (10; 210; 310) and wherein the housing further includes an outlet opening means (16) for separating a liquid from an aerosol.

10. Apparatus according to claim 1, wherein the movable (122) and stationary elements (124) are in the shape of hollow cylinders and disposed alternately coaxially relative to each other.

11. Apparatus according to claim 10 wherein a gas intake connection (112) is arranged at the periphery of the housing and a gas outlet connection (114) is arranged at one end of the housing.

12. Apparatus according to claim 10, wherein the passages are disposed in respective mutually oppositely arranged regions (126) of the movable (122) and stationary elements (124).

13. Apparatus according to claim 10, wherein the movable elements (122) are arranged on a common driven carrier disc (119).

14. Apparatus according to claim 10, wherein the housing further includes an outlet opening means (116) for separating a liquid from an aerosol.

15. Apparatus according to claim 1, wherein the stationary (24; 124; 224) and/or the movable (22; 122; 322) elements are in the form of apertured plates.

16. Apparatus according to claim 1, wherein the stationary (24; 124; 224) and/or the movable (22; 122; 322) elements are in the form of grills.

17. Apparatus according to claim 1, further comprising an electric motor means (20) for driving the movable elements.

18. Apparatus according to claim 1, wherein the stationary and/or movable filter or catalyst elements (224; 322) are hollow and communicate with a feed device (200; 300) for an auxiliary gas.

19. Apparatus according to claim 18, wherein the movable filter or catalyst elements (322) are hollow and have outlet openings for the auxiliary gas, which are formed by outward bulge portions (348) which rise in a direction opposite to the direction of rotation and form a rearwardly directed opening (350).

20. Apparatus according to claim 1, wherein the housing further includes an outlet opening means for separating a liquid from an aerosol, and wherein said stationary and/or movable filter on catalyst elements are hollow and communicate with a feed device for an air supply.

* * * * *